US010584621B2

(12) United States Patent
Fey

(10) Patent No.: US 10,584,621 B2
(45) Date of Patent: Mar. 10, 2020

(54) METHOD AND CONTROL UNIT FOR CONTROLLING THE FILL LEVEL OF A CATALYTIC CONVERTER

(71) Applicant: Robert Bosch GmbH, Stuttgart (DE)

(72) Inventor: Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 82 days.

(21) Appl. No.: 15/965,260

(22) Filed: Apr. 27, 2018

(65) Prior Publication Data

US 2018/0320571 A1 Nov. 8, 2018

(51) Int. Cl.
| | | |
|---|---|---|
| *F01N 3/10* | (2006.01) | |
| *F01N 3/20* | (2006.01) | |
| *F01N 9/00* | (2006.01) | |
| *F01N 11/00* | (2006.01) | |
| *F02D 41/02* | (2006.01) | |
| *F02D 41/14* | (2006.01) | |
| *F02B 77/08* | (2006.01) | |

(52) U.S. Cl.
CPC ............... *F01N 3/20* (2013.01); *F01N 3/101* (2013.01); *F01N 9/005* (2013.01); *F01N 11/007* (2013.01); *F02B 77/086* (2013.01); *F02D 41/0295* (2013.01); *F02D 41/1401* (2013.01); *F02D 41/1441* (2013.01); *F02D 41/1454* (2013.01); *F01N 2430/06* (2013.01); *F01N 2900/0416* (2013.01); *F01N 2900/1624* (2013.01); *F01N 2900/1814* (2013.01); *F02D 2041/1433* (2013.01); *F02D 2200/0814* (2013.01); *F02D 2200/0816* (2013.01)

(58) Field of Classification Search
CPC . F01N 3/101; F01N 3/20; F01N 9/005; F01N 11/007; F01N 2430/06; F01N 2900/0416; F01N 2900/1624; F01N 2900/1814; F02D 41/0295; F02D 41/1401; F02D 41/1441; F02D 41/1454; F02D 2041/1433; F02D 2200/0814; F02D 2200/1816; F02B 77/086
See application file for complete search history.

(56) References Cited

U.S. PATENT DOCUMENTS

| | | | | |
|---|---|---|---|---|
| 7,769,534 B1* | 8/2010 | Xu | ............ | F02D 41/1441 123/688 |
| 2001/0025485 A1* | 10/2001 | Kobayashi | .......... | F02D 41/0295 60/285 |
| 2014/0345584 A1* | 11/2014 | Jammoussi | ............. | F02D 41/30 123/672 |

FOREIGN PATENT DOCUMENTS

| | | |
|---|---|---|
| DE | 10339063 A1 | 2/2005 |
| DE | 102009045376 A1 | 4/2011 |
| DE | 102011081894 A1 | 2/2013 |

(Continued)

*Primary Examiner* — Audrey K Bradley
(74) *Attorney, Agent, or Firm* — Norton Rose Fulbright US LLP; Gerard Messina

(57) ABSTRACT

A method for controlling a fill level of a catalytic converter that is in an exhaust aftertreatment system of an exhaust tract downstream from an internal combustion engine includes an exhaust gas sensor that is upstream of the catalytic converter measuring, and producing a signal representing, a concentration of an exhaust component; correcting a dynamic distortion present in the produced signal to produce a corrected signal; determining the fill level of the catalytic converter by inputting the corrected signal into a modeling function; and performing a control that modifies the fill level based on the determined fill level.

9 Claims, 2 Drawing Sheets

(56) References Cited

FOREIGN PATENT DOCUMENTS

| DE | 102012209195 A1 | 12/2013 |
|----|-----------------|---------|
| DE | 102014209392 A1 | 11/2014 |
| DE | 102016219689 A1 | 4/2018  |

\* cited by examiner

METHOD AND CONTROL UNIT FOR CONTROLLING THE FILL LEVEL OF A CATALYTIC CONVERTER

CROSS-REFERENCE TO RELATED APPLICATIONS

The present application claims priority under 35 U.S.C. § 119 to DE 10 2017 207 407.8, filed in the Federal Republic of Germany on May 3, 2017, the content of which is hereby incorporated by reference herein in its entirety.

FIELD OF THE INVENTION

The present invention relates to a method for controlling the fill level of a catalytic converter that is situated in an exhaust gas treatment system of an exhaust tract, downstream from an internal combustion engine, in the case of which the fill level of an exhaust gas component storage of the catalytic converter is modeled as an input variable taking into account a signal that is a function of the concentration of an exhaust gas component, the concentration being measured with the aid of an exhaust gas sensor situated upstream from the catalytic converter and the corresponding signal of the exhaust gas sensor, which is a function of the concentration, being fed to a model for modeling the fill level. The present invention further relates to a control unit which is configured to carry out the method.

BACKGROUND

In the case of an incomplete combustion of the air/fuel mixture in a gasoline engine, a plurality of combustion products, among which hydrocarbons (HC), carbon monoxide (CO), and nitrogen oxides ($NO_x$) are subject to statutory limitations, are discharged in addition to nitrogen ($N_2$), carbon dioxide ($CO_2$), and water ($H_2O$). According to the hitherto known related art, applicable exhaust gas limiting values for motor vehicles can only be adhered to if a catalytic converter is used for exhaust aftertreatment. By using a three-way catalytic converter, it is possible to convert the above-named emission components.

A concurrently high conversion rate for HC, CO, and $NO_x$ is achieved in three-way catalytic converters only within a narrow lambda range around the stoichiometric operating point (lambda=1), the so-called "catalytic converter window."

In order to operate the catalytic converter within this lambda range, a lambda control, which is based on the signals from lambda sensors downstream and upstream from the catalytic converter, is typically employed in present engine control systems. To control the lambda upstream from the catalytic converter, the oxygen content of the exhaust gas upstream from the catalytic converter is measured using the lambda sensor. The control corrects the fuel quantity from the pilot control as a function of this measured value. For a more accurate control, the exhaust gas downstream from the catalytic converter is additionally analyzed using an additional lambda sensor. This signal is used for a setpoint control which is superimposed on the lambda control upstream from the catalytic converter. A jump lambda sensor which has a very steep characteristic at lambda=1 and can therefore indicate lambda=1 very accurately is generally used as the lambda sensor downstream from the catalytic converter.

In the control concepts, the lambda sensors can be analyzed with regard to dynamic errors and corrected, if necessary. Methods for diagnosing the dynamics of lambda sensors are provided in DE 10 2014 209 392 A1, DE 10 2012 209 195 A1, DE 10 2009 045 376 A1, and DE 10 2011 081 894 A1, for example.

Present control concepts have the disadvantage that they detect an exit from the catalytic converter window only at a late point based on the voltage of the jump lambda sensor downstream from the catalytic converter.

SUMMARY

One alternative to controlling the three-way catalytic converter based on the signal of a lambda sensor downstream from the catalytic converter is controlling the oxygen fill level of the catalytic converter. Since this fill level is not measurable, it can only be modeled and balanced. For balancing the fill level, it is necessary to measure the exhaust gas lambda upstream from the catalytic converter.

Methods for controlling an oxygen fill level are referenced in DE 10 2016 222 418 (not yet published) and DE 10 2016 219 689 of the applicant, as well as in DE 103 39 063 A1.

An object underlying the present invention is to provide a method and a control unit for controlling the fill level of a catalytic converter at an improved accuracy.

It is provided for the method that the signal which is output by the exhaust gas sensor is checked for the presence of a dynamic distortion prior to further processing in the model and the dynamic distortion is corrected, if present. In contrast to a steady-state distortion, a dynamic distortion results in a time-dependent signal error. By using corrective measures to compensate for the dynamic distortion, the accuracy of the concentration of the exhaust gas component as the input variable into the model is substantially improved, thus significantly increasing the robustness and accuracy of the method according to the present invention for controlling the fill level. Phases in which the catalytic converter window is left occur less frequently and the emissions downstream from the catalytic converter are reduced.

In addition to correcting the dynamic distortion, a steady-state distortion can be checked and, if necessary, compensated for, as provided in DE 10 2016 219 689, for example. A steady-state distortion can develop from aging or tolerance effects, for example, and result in a displacement of the actual sensor characteristic as compared to a reference sensor characteristic.

In an example embodiment, the fill level is an oxygen fill level, the signal is a lambda signal, and the dynamic distortion is an asymmetric deceleration of the lambda signal, the response of the lambda signal to a lambda change in the exhaust gas in one direction, i.e., from rich to lean or from lean to rich, taking place more slowly than in the other direction. An asymmetric deceleration of the lambda signal may be caused by a change in the sensor dynamics. Asymmetric decelerations occur, for example, in the form of an increased (filter) time constant, a delay, or a combination of time constant and delay. In the case of a dynamically asymmetric deceleration, a greater input of rich gas than of lean gas into the catalytic converter (or vice versa) is detected averaged over time than is in fact the case if the rich-to-lean transition of the lambda signal upstream from the catalytic converter is decelerated as compared to the lean-to-rich transition (or vice versa). This results in a distorted modeling of the oxygen fill level, the consequence being increased emissions in the case of a control based on the oxygen fill level. By correcting the asymmetric deceleration, the accuracy of the control is improved, whereby increased emissions are prevented. The method is applicable to different sensor types, in particular to broadband lambda sensors and jump lambda sensors.

The asymmetric deceleration of the lambda signal is advantageously symmetrized, the asymmetrically decelerated lambda signal being corrected by a similar asymmetric deceleration in the opposite direction (in the case of a deceleration from rich to lean, in the lean-to-rich direction and vice versa). "Similar" means in this context a correction of the type that a lambda signal results which behaves dynamically symmetrical in each case. For this purpose, the uncorrected initial lambda signal is subjected to an equally extensive, preferably identically trending correction, when the signal moves in the direction in which it is to be decelerated.

Reliable accuracy for the symmetrization is achievable in that the gradient of the lambda signal is formed and it is detected based on the gradient of the lambda signal that the direction (from lean to rich or from rich to lean) is present in which the lambda signal is to be decelerated. The lambda signal is advantageously smoothed prior to the gradient formation in such a way that the effect of signal interferences on the direction recognition is reduced.

Reliable accuracy for the symmetrization is furthermore achievable in that the deceleration in the rich-to-lean direction or in the lean-to-rich direction is activated as soon as it is detected based on the gradient that the lambda signal rises (in the case of a deceleration in the rich-to-lean direction) or drops (in the case of a deceleration in the lean-to-rich direction).

A precise symmetrization is achievable in that the deceleration in the rich-to-lean direction or in the lean-to-rich direction is deactivated when the lambda signal drops (in the case of a deceleration in the rich-to-lean direction) or rises (in the case of a deceleration in the lean-to-rich direction) and when additionally the corrected lambda signal crosses the uncorrected, asymmetrically decelerated lambda signal, i.e., the corrected signal characteristic meets the uncorrected signal characteristic in its progression. By not deactivating the signals until they cross, jumps can be prevented in the progression of the corrected lambda signal.

The corrected signal is preferably converted within the model into input variables for a catalytic converter model connected downstream with the aid of an input emission model, for example into the concentrations of oxygen ($O_2$) and/or CO upstream from the catalytic converter.

In an example embodiment, the input and output of the exhaust gas component of the catalytic converter is balanced in the catalytic converter model and the fill level is ascertained therefrom, the variables computed with the aid of the input emission model and/or also the lambda signal being immediately usable. It is advantageous in this case to calibrate the catalytic converter model with the aid of a sensor located downstream from the catalytic converter. For example, a jump lambda sensor downstream from the catalytic converter indicates unambiguously when the catalytic converter is completely filled with oxygen or is completely emptied of oxygen. This can be used to reconcile the modeled oxygen fill level with the actual oxygen fill level after lean or rich phases and to adapt the catalytic converter model, if necessary. This makes it possible to increase the reliability of the catalytic converter model and thus of the fill level control.

In an example embodiment of the method, a lambda setpoint value is formed, a predetermined setpoint fill level being converted into a base lambda setpoint value using a second catalytic converter model which is inverse to the first catalytic converter model, a deviation of the fill level from the predetermined setpoint fill level being ascertained and processed with the aid of a fill level control to form a lambda setpoint value correction value, a sum of the base lambda setpoint value and the lambda setpoint value correction value being formed and the sum being used to form a correction value with the aid of which a fuel metering to at least one combustion chamber of the internal combustion engine is influenced. In an example embodiment, the thus formed sum is used as the lambda setpoint value of a conventional lambda control, as provided in DE 10 2016 222 418 of the applicant, for example.

The present invention is elucidated in greater detail below based on exemplary embodiments with reference to the drawings.

DETAILED DESCRIPTION

Figure 1:
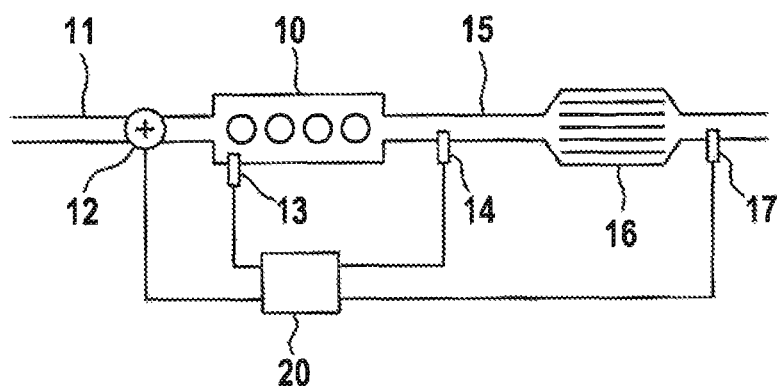
FIG. 1 schematically shows a technical environment in which a method is performed according to an example embodiment of the present invention.

FIG. 1 schematically shows a technical environment in which the method according to the present invention is used in an example embodiment of the present invention. An internal combustion engine 10, which is designed as a gasoline engine, is supplied with combustion air via an air supply 11. The air mass of the combustion air can be determined using a mass airflow sensor 12 in air supply 11. The supplied air mass is used to determine the fuel quantity to be metered at a lambda air ratio to be pilot-controlled. The exhaust gas of internal combustion engine 10 is discharged via an exhaust tract 15 in which an exhaust aftertreatment system including a catalytic converter is situated. The catalytic converter corresponds in this case to a three-way catalytic converter 16 which is known to convert the three exhaust gas components NOR, HC, and CO in three different reaction pathways and has the ability to store oxygen. In exhaust tract 15, a first lambda sensor 14, which can be designed as a broadband or jump sensor, is furthermore situated upstream from three-way catalytic converter 16 and a second lambda sensor 17, for example a jump sensor, is situated downstream, the signals of both sensors being supplied to a control unit 20. Control unit 20 is furthermore supplied with the signal of a mass airflow sensor 12. On the basis of the ascertained air mass and the signals of lambda sensors 14, 17, the fuel mass which is supplied to internal combustion engine 10 via a fuel metering 13 is determined in control unit 20. For this purpose, control unit 20 includes a pilot control and a control device for controlling the composition of the air/fuel mixture on the basis of the signals of lambda sensors 14, 17. Control unit 20 is furthermore designed to control the oxygen fill level of three-way catalytic converter 16 in a model-based manner according to the method according to the present invention (cf. FIG. 2).

Figure 2:
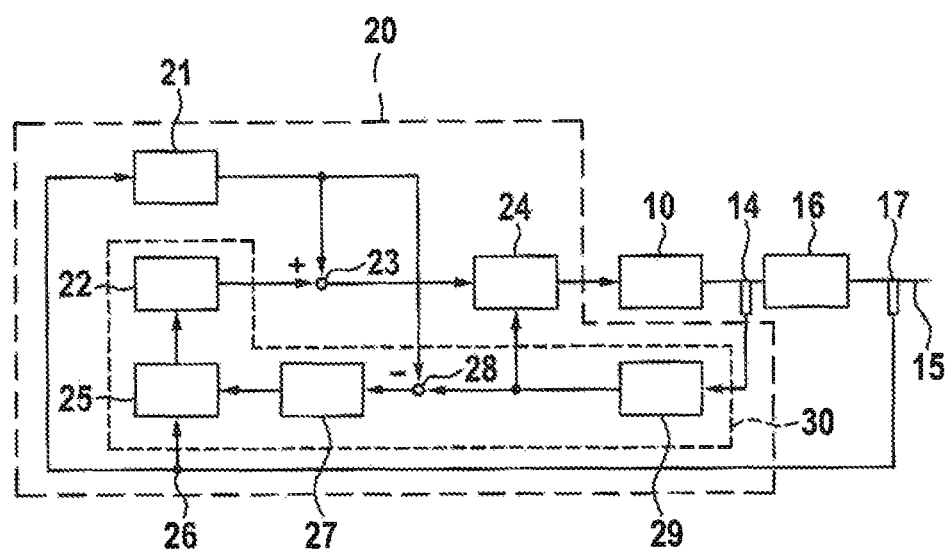
FIG. 2 is a flowchart that schematically illustrates a method according to an example embodiment of the present invention.

FIG. 2 shows by way of example a diagram of a control according to the present invention. Here, the reference numerals already used in FIG. 1 correspond to the same elements or elements which are at least comparable in their functions. The output (i.e., uncorrected) signal of first lambda sensor 14 is checked within control unit 20 for the presence of a dynamic distortion, in particular of an asymmetric deceleration, and, if present, the dynamic distortion is corrected in a signal processing 29.

Figure 3:
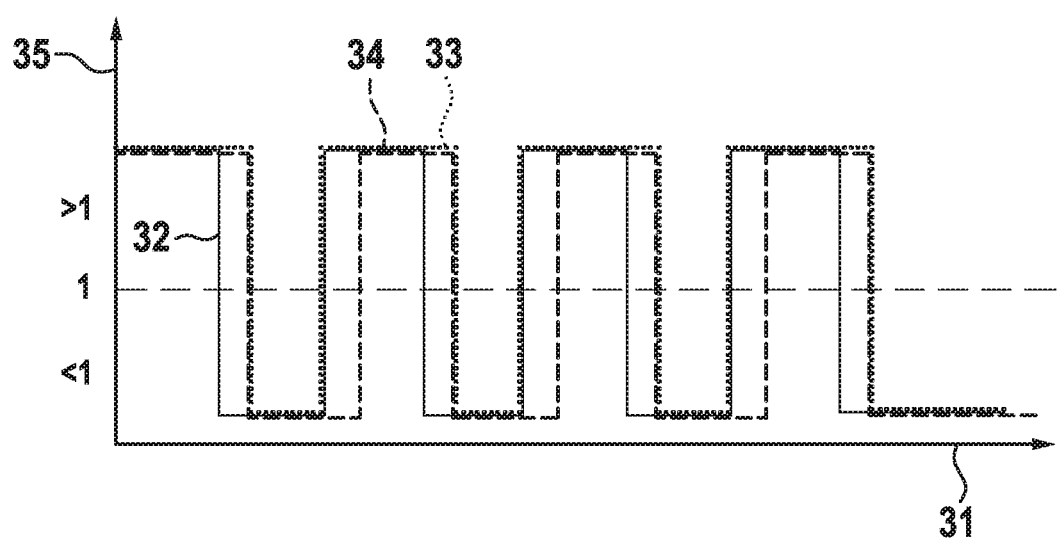
FIG. 3 is a graph that schematically illustrates an asymmetric deceleration of a lambda signal and its correction according to an example embodiment of the present invention.

The asymmetric deceleration and its correction are schematically illustrated in FIG. 3 (for the sake of simplification as a rectangular lambda profile) as an example of an asymmetric deceleration in the lean-to-rich direction. Lambda air ratio 35 is plotted against time 31. Solid curve profile 32 corresponds to the actual lambda progression upstream from three-way catalytic converter 16, the mean value over time being lambda=1. Dotted curve profile 33 corresponds to the asymmetrically decelerated output signal, the mean value over time being lambda>1. Dashed curve profile 34 corresponds to the corrected, in this case symmetric, lambda signal after the correction. The mean value over time is lambda=1. The symmetrized lambda signal therefore shows the same mean value over time as the actual lambda air ratio. This results in an improved balancing of the oxygen input and output and thus in an improved and more robust control of the oxygen fill level of three-way catalytic converter 16.

In addition, the lambda signal in signal processing 29 can be corrected with regard to a constant offset of the sensor characteristic which may result due to an aging- or temperature-induced displacement of the lambda=1 point. This correction advantageously allows for a (more cost-effective) jump lambda sensor to be used upstream from three-way catalytic converter 16 instead of a broadband sensor. Finally, the instantaneous exhaust gas composition and cross sensitivities of the exhaust gas sensor with regard to different exhaust gas components can be taken into account. The corrected lambda signal is supplied to a lambda control 24 which controls the composition of the air/fuel mixture supplied to internal combustion engine 10. In a setpoint controller 21, the output signal of second lambda sensor 17 can be evaluated in order to correct lambda control 24 in such a way that the desired lambda value of lambda=1 can be adhered to on average.

Following the correction, the lambda signal is further processed in a fill level control 30 within control unit 20. Fill level control 30 controls the oxygen fill level of three-way catalytic converter 16. After being corrected using the signal of setpoint controller 21, the output signal of signal processing 29 is supplied in a differential stage 28 to an input emission model 27. This is where the corrected signal is converted into input variables for a catalytic converter model 25 connected downstream. For example, it is advantageous to convert lambda into the concentrations of $O_2$, CO, $H_2$, and HC upstream from three-way catalytic converter 16. The variables computed with the aid of input emission model 27 and, if applicable, additional input variables are supplied to catalytic converter model 25. The fill level of three-way catalytic converter 16 is modeled in catalytic converter model 25. For this purpose, a balancing of the oxygen input and output is in particular provided. It is advantageous in this case to take into account the reaction kinetics of the exhaust gas components computed with the aid of input emission model 27 during the modeling and to divide three-way catalytic converter 16 into multiple zones, in each of which the fill level is modeled, in order to be able to illustrate the filling and emptying processes in a more realistic manner. For controlling the fill level of the catalytic converter, it is advantageous to standardize the fill levels of the individual zones. The fill levels of the individual zones are converted—if applicable after weighting—into a mean fill level of three-way catalytic converter 16. The weighting makes it possible to take into account that the fill level in a comparably small range, for example at the exit of three-way catalytic converter 16, is crucial for an instantaneous exhaust gas composition downstream from three-way catalytic converter 16. The mean fill level of three-way catalytic converter 16 is controlled by fill level control 30 to such a setpoint value that the probability of breakouts to lean and rich at the exit of three-way catalytic converter 16 are minimized. This results in emissions being minimized.

If necessary, catalytic converter model 25 can be calibrated via calibration 26 with the aid of the output signal of second lambda sensor 17 situated downstream from three-way catalytic converter 16. The output signal of second lambda sensor 17 indicates when three-way catalytic converter 16 is completely filled with oxygen or completely emptied of oxygen. This can be used to reconcile the modeled oxygen fill level with the actual oxygen fill level after a lean or a rich phase and to adapt catalytic converter model 25, if necessary. The reliability of catalytic converter model 25 can be increased in this way.

The fill level of three-way catalytic converter 16 is relayed by catalytic converter model 25 to a fill level control 22. The latter adapts the setpoint value for lambda control 24 via an adding-up stage 23 together with the output signal of setpoint controller 21.

In addition, a second catalytic converter model (not shown in the present case) which is inverse to (first) catalytic converter model 25 and which results from a mathematical transformation from the algorithm of the first catalytic converter model, as provided in DE 10 2016 222 418 of the applicant, can be present. This catalytic converter model can be used to compute a base lambda setpoint value. For this purpose, the inverse second catalytic converter model is supplied with a fill level setpoint value (according to a setpoint fill level) as the input variable, for example from the memory of control unit 20. The fill level setpoint value can be optionally filtered in order to only allow for those changes in the input variable of the inverse second catalytic converter model, which the control process overall is able to follow. In parallel to computing the base lambda setpoint value, a fill level control deviation is advantageously obtained as a deviation of the fill level modeled using first catalytic converter model 25 from the fill level setpoint value. This fill level control deviation is supplied to a fill level control algorithm (not shown in the present case) which uses it to form a lambda setpoint value correction value. The latter is added to the base lambda setpoint value computed by the inverse catalytic converter model.

In an example embodiment, the sum thus obtained is used as the lambda setpoint value of a conventional lambda control. The conventional lambda control is superimposed in this way by a control of the oxygen fill level of three-way catalytic converter 16. This formation of the base lambda setpoint value, which in a way acts as a pilot control of the fill level control, can be adapted similarly to the adaptation of first catalytic converter model 25 on the basis of the signal of second lambda sensor 17 which is situated downstream from three-way catalytic converter 16.

All the examples described here represent very robust methods which are an improvement over known methods, in particular also due to checking and, in the presence of a dynamic distortion, correction of the output signal of first lambda sensor 14 carried out in signal processing 29.

What is claimed is:

1. A method for controlling a fill level of a catalytic converter that is in an exhaust aftertreatment system of an exhaust tract, downstream from an internal combustion engine, the method comprising:
    an exhaust gas sensor that is upstream of the catalytic converter measuring, and producing a signal representing, a concentration of an exhaust component;
    correcting, by a processor, a dynamic distortion present in the produced signal to produce a corrected signal;
    determining, by the processor, the fill level of the catalytic converter by inputting the corrected signal into a first catalytic converter model; and
    performing a control, by the processor, that modifies the fill level based on the determined fill level;
    wherein, a predetermined setpoint fill level is converted into a base lambda setpoint value using a second catalytic converter model which is inverse to the first catalytic converter model, a deviation of the fill level from the predetermined setpoint fill level is ascertained and processed with the aid of a fill level control to form a lambda setpoint value correction value, a sum of the base lambda setpoint value and the lambda setpoint value correction value is formed, and the sum is used to form a correction value with which a fuel metering to at least one combustion chamber of the internal combustion engine is influenced.

2. The method of claim 1, wherein the corrected signal is converted, using an input emission model into input variables for the first catalytic converter model.

3. The method of claim 2, wherein input and output of an exhaust gas component of the catalytic converter is balanced in the first catalytic converter model and the fill level is ascertained from the balanced input and output.

4. The method of claim 1, wherein the fill level is an oxygen fill level, the signal output by the exhaust gas sensor is a lambda signal, and the dynamic distortion is an asymmetric deceleration of the lambda signal, a response of the lambda signal to a lambda change in the exhaust gas in one of a first direction from rich to lean and a second direction from lean to rich, taking place more slowly than in the other of the first and second directions.

5. The method of claim 4, wherein the asymmetric deceleration of the lambda signal is symmetrized, the asymmetrically decelerated lambda signal being corrected by a similar asymmetric deceleration in an opposite direction.

6. The method of claim 5, wherein the deceleration in the rich-to-lean direction or in the lean-to-rich direction is deactivated when the lambda signal drops or rises and when, additionally, the corrected lambda signal crosses the uncorrected, asymmetrically decelerated lambda signal.

7. The method of claim 5, wherein a gradient of the lambda signal is formed and that the direction is present in which the lambda signal is to be decelerated is detected based on the gradient of the lambda signal.

8. The method of claim 7, wherein the deceleration in the rich-to-lean direction or in the lean-to-rich direction is activated as soon as it is detected based on the gradient that the lambda signal rises or drops.

9. A control unit configured to control a fill level of a catalytic converter that is in an exhaust aftertreatment system of an exhaust tract, downstream from an internal combustion engine, the control unit comprising:
    processing circuitry interfacing with an exhaust gas sensor that is upstream of the catalytic converter, wherein the processing circuitry is configured to:
    obtain from the exhaust gas sensor a signal representing a measured concentration of an exhaust component;
    correct a dynamic distortion present in the produced signal to produce a corrected signal;
    determine the fill level of the catalytic converter by inputting the corrected signal into a first catalytic converter model; and
    perform a control that modifies the fill level based on the determined fill level;
    wherein, a predetermined setpoint fill level is converted into a base lambda setpoint value using a second catalytic converter model which is inverse to the first catalytic converter model, a deviation of the fill level from the predetermined setpoint fill level is ascertained and processed with the aid of a fill level control to form a lambda setpoint value correction value, a sum of the base lambda setpoint value and the lambda setpoint value correction value is formed, and the sum is used to form a correction value with which a fuel metering to at least one combustion chamber of the internal combustion engine is influenced.

* * * * *